Dec. 29, 1942.   J. KRAL   2,306,961
FASTENER MEMBER AND FASTENER INSTALLATION
Filed Oct. 24, 1940
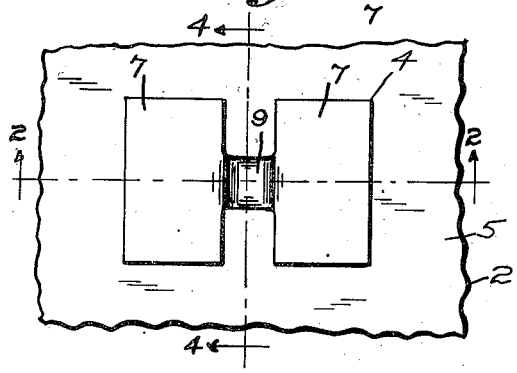
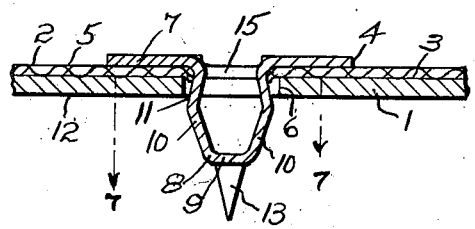
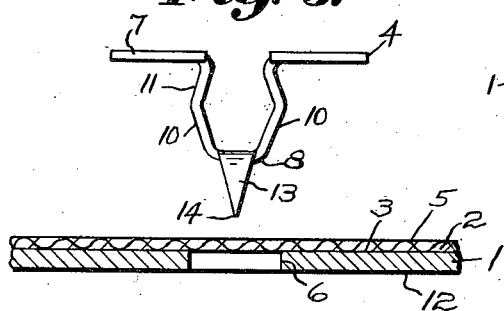
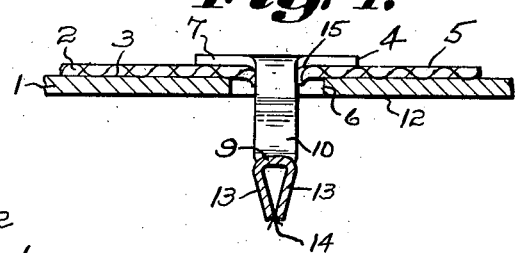
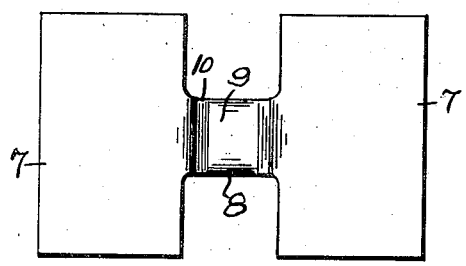
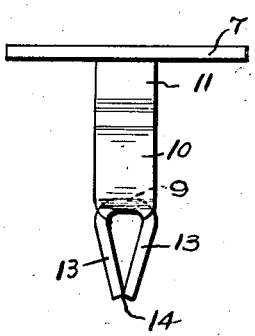
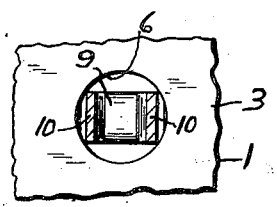
Inventor:
Joseph Kral.
By John Todd
Att'y.

Patented Dec. 29, 1942

2,306,961

UNITED STATES PATENT OFFICE 2,306,961

FASTENER MEMBER AND FASTENER INSTALLATION

Joseph Kral, Cambridge, Mass., assignor to United-Carr Fastener Corporation, Cambridge, Mass., a corporation of Massachusetts Application October 24, 1940, Serial No. 362,597

5 Claims. (Cl. 24—213)

This invention relates to improvements in fastener members and also to installations wherein the fastener is used to secure covering material and the like to a metal supporting panel.

The chief object of my invention is the provision of a fastener member constructed for self-piercing entrance through covering material overlying an opening of a supporting panel, after which action it enters snap fastener engagement with the supporting panel through the opening thereof so as to secure the covering material to the panel. Thus by use of my improved fastener it is not necessary to form apertures in the covering material prior to applying the fastener to the assembly.

Other objects and uses of my invention will be apparent from inspection of the drawing and specification hereinbelow set forth.

Referring to the drawing, in which I have illustrated a preferred embodiment of my invention:

Fig. 1 is a top plan view of my preferred installation showing covering material secured to a supporting panel by means of my improved fastener member;

Fig. 2 is a section taken along the line 2—2 of Fig. 1;

Fig. 3 is a section similar to Fig. 2 but showing the relative position of the parts prior to applying the fastener to the work;

Fig. 4 is a section taken along the line 4—4 of Fig. 1;

Fig. 5 is a top plan view of my improved fastener member per se;

Fig. 6 is a side view of the fastener member shown in Fig. 5; and

Fig. 7 is a section taken along the line 7—7 of Fig. 2.

Referring to my preferred installation illustrated in Figs. 1-4, I have shown a relatively thin supporting panel 1, which is preferably metal, and a covering 2 of any suitable material such as cloth, rubber and the like overlying the outer surface 3 of the supporting panel and secured in superposed relation to the supporting panel by means of my improved fastener member 4. The fastener member 4 has a base portion overlying the outer surface 5 of the covering material 2 and a yieldable shank extending through the covering material and disposed in snap fastener engagement with the panel 1 through an aperture 6 thereof. The covering material 2 is imperforate prior to passage of said shank therethrough, as most clearly shown in Fig. 3.

Referring in detail to my improved fastener member, I have shown one made entirely from a single strip of sheet metal and having a base portion comprising head sections 7 formed from the ends of the strip. The strip is bent between the head sections 7—7 to form a yieldable shank comprising a nose 8, which is relatively blunt in my preferred construction, so as to provide a flat portion 9 at the forward end of the shank and a pair of opposed bowed legs 10 between the portion 9 and the head sections 7. The legs 10—10 diverge from the nose and then converge forming shoulders 11 for snap fastener engagement behind the inner surface 12 of the supporting panel in final applied position, as most clearly shown in Figs. 2 and 7.

The chief feature of my invention is embodied in the covering piercing means which I have provided at the forward end of the shank and which is adapted to pierce that portion of the covering material 2 overlying the aperture 6 of the supporting panel 1 when the shank of the fastener is moved from a position on the outer side of the work, as shown in Fig. 3, through the covering material to engage the panel. This covering material piercing means, in my preferred construction, comprises a pair of opposed triangular-shaped cutting portions 13 which have their bases integrally joined to opposed edges of the flat portion 9 of the nose 8 and their opposed broad surfaces converging toward their apexes which are in substantial abutment thereby forming a relatively sharp material piercing point 14 disposed forwardly of the shank.

In assembling the parts of my installation, the imperforate covering material 2 is disposed on the outer surface 3 of the supporting panel 1. Next, the fastener member is moved from a position outside the covering material, as shown in Fig. 3, toward the opening 6 of the panel whereby the point 14 of the fastener cuts through the covering material so as to permit passage of the yieldable legs 10 through the cut 15 formed by the piercing action. Thereafter, as the parts are moved together, the yieldable legs 10—10 extend through the openings 6 of the panel 1 and are compressed during said passage until the head sections 7 of the fastener engage the outer surface of the covering material, at which time the yieldable legs expand to engage the shoulders 11 behind the supporting panel 1, as shown in Figs. 2 and 7. In ordinary applications the fastener may be moved into final applied position entirely by hand, the covering material 2 being unable to resist penetration of the point 14 therethrough.

As a result of my invention, substantial savings of labor and time in assembling the parts of the installation are effected as it is not necessary to form openings in the covering material and align these openings with the openings of the supporting panel prior to application of the fastener member to the parts. My fastener is particularly useful in installations in which it is desired to secure covering material to a supporting frame. Thus, for example, in the manufacture of arm rests for the automotive trade it is necessary only to cut the covering material to the desired size to overlie the metal form, after which the covering material may be applied to the form and then secured in firm fastened relation to the form by hand application of my improved fastener member to the parts as hereinabove described.

Although I have illustrated and described a preferred embodiment of my invention, I do not wish to be limited thereby because the scope of my invention is best defined by the following claims.

I claim:

1. A snap fastener member having a flat base, a shank projecting from said base having opposed bowed resilient portions adapted to contract and expand for snap fastener engagement through an aperture of a supporting panel the plane of a flat surface of said base being substantially normal to the axis of said shank whereby said fastener is secured to said panel, and a portion at the end of said shank away from said base having means to pierce material covering said aperture of said support prior to entrance of said shank into said aperture.

2. A snap fastener member having a flat base, a resilient shank projecting from said base adapted to extend through an aperture of a supporting part and engage said support whereby said fastener is secured thereto the plane of a flat surface of said base being substantially normal to the axis of said shank, and opposed cutting portions integral with the end of said shank away from said base, each of said cutting portions having free ends in substantial abutment and forming a point disposed forwardly of said end of said shank so as to pierce material covering said aperture of said support prior to entrance of said shank into said aperture.

3. A snap fastener member formed from a single strip of metal having a base part comprising two head sections and a resilient shank formed from material between the ends of said strip, said shank being adapted to extend through an aperture of a support to engage said support, said shank having a nose at its end away from said head sections and a pair of opposed shouldered legs between said nose and said head sections, and opposed triangular-shaped cutting portions integrally joined to said nose at their bases and having their apexes disposed forwardly of said nose and in substantial abutment, said cutting portions being adapted to pierce material covering said aperture of said support prior to entrance of said shank into said aperture.

4. In combination, a metal supporting panel having an aperture, covering material which is normally imperforate superposed upon said support and overlying said aperture, and a snap fastener member having a base comprising flat head sections with one of its broad surfaces abutting said covering material and a shank extending from said head sections through said covering material and said aperture of said support and in snap fastener engagement with said support, said shank having a nose and a pair of opposed shouldered legs between said nose and said head sections, and a pair of opposed cutting portions extending from said nose forwardly of said shank, each of said cutting portions tapering to a point at its forward end and said cutting portions having opposed broad surfaces converging into substantial abutment at said forward end, and said covering material having an aperture cut by said cutting portions.

5. A snap fastener member formed from a single strip of metal having a base part comprising two head sections and a resilient shank formed from material between the ends of said strip, said shank being adapted to extend through an aperture of a support to engage said support, said shank having a nose at its end away from said head sections and a pair of opposed imperforate legs between said nose and said head sections, at least one of said legs having a shoulder for snap fastener engagement through said aperture of said support, and opposed cutting portions integrally joined to said base between adjacent edges of said legs, said cutting portions extending forwardly of said nose and being pointed to pierce material covering said aperture of said support prior to entrance of said shank into said aperture.

JOSEPH KRAL.